(12) United States Patent
McKerchar et al.

(10) Patent No.: US 10,896,254 B2
(45) Date of Patent: Jan. 19, 2021

(54) SANDBOX ENVIRONMENT FOR DOCUMENT PREVIEW AND ANALYSIS

(71) Applicant: Sophos Limited, Abingdon (GB)

(72) Inventors: Ross McKerchar, Bristol (GB); John Edward Tyrone Shaw, Oxford (GB); Andrew J. Thomas, Oxfordshire (GB); Russell Humphries, Horley (GB); Kenneth D. Ray, Seattle, WA (US); Daniel Salvatore Schiappa, Bedford, NH (US)

(73) Assignee: Sophos Limited, Abingdon (GB)

( * ) Notice: Subject to any disclaimer, the term of this patent is extended or adjusted under 35 U.S.C. 154(b) by 87 days.

(21) Appl. No.: 16/310,251

(22) PCT Filed: Jun. 29, 2016

(86) PCT No.: PCT/US2016/040135
§ 371 (c)(1),
(2) Date: Dec. 14, 2018

(87) PCT Pub. No.: WO2018/004572
PCT Pub. Date: Jan. 4, 2018

(65) Prior Publication Data
US 2019/0213325 A1 Jul. 11, 2019

(51) Int. Cl.
*G06F 21/53* (2013.01)
*G06F 21/51* (2013.01)
*G06F 21/56* (2013.01)
*G06F 40/106* (2020.01)

(52) U.S. Cl.
CPC .............. *G06F 21/53* (2013.01); *G06F 21/51* (2013.01); *G06F 21/56* (2013.01); *G06F 40/106* (2020.01)

(58) Field of Classification Search
CPC ........... G06F 21/51; G06F 21/53; G06F 21/56
See application file for complete search history.

(56) References Cited

U.S. PATENT DOCUMENTS

| 5,313,616 A | 5/1994 | Cline et al. |
| 5,398,196 A | 3/1995 | Chambers |
| 5,623,600 A | 4/1997 | Chen et al. |
| 5,974,549 A | 10/1999 | Golan |
| 5,983,348 A | 11/1999 | Ji |

(Continued)

FOREIGN PATENT DOCUMENTS

WO WO-2018004572 1/2018

OTHER PUBLICATIONS

WIPO, "PCT Application No. PCT/US16/40135 International Preliminary Report on Patentability dated Jan. 10, 2019", 8 pages.

(Continued)

*Primary Examiner* — Ali Shayanfar
(74) *Attorney, Agent, or Firm* — Strategic Patents, P.C.

(57) ABSTRACT

Attachments or other documents can be transmitted to a sandbox environment where they can be concurrently opened for remote preview from an endpoint and scanned for possible malware. A gateway or other intermediate network element may enforce this process by replacing attachments, for example, in incoming electronic mail communications, with links to a document preview hosted in the sandbox environment.

21 Claims, 9 Drawing Sheets

(56) References Cited

U.S. PATENT DOCUMENTS

| | | | | |
|---|---|---|---|---|
| 8,965,892 B1* | 2/2015 | Emigh | ................ | G06F 16/9535 |
| | | | | 707/737 |
| 10,187,446 B2* | 1/2019 | Carames | ............. | H04L 63/1441 |
| 10,200,390 B2* | 2/2019 | Rostami-Hesarsorkh | .................... | |
| | | | | H04L 63/1425 |
| 2005/0235203 A1* | 10/2005 | Undasan | ............... | G06F 3/0481 |
| | | | | 715/205 |
| 2006/0021029 A1* | 1/2006 | Brickell | .................. | G06F 21/51 |
| | | | | 726/22 |
| 2007/0089053 A1* | 4/2007 | Uhlig | .................... | G06F 3/1297 |
| | | | | 715/255 |
| 2009/0240737 A1* | 9/2009 | Hardisty | ................ | G06F 16/10 |
| 2012/0304244 A1 | 11/2012 | Xie et al. | | |
| 2014/0283071 A1* | 9/2014 | Spikes | ................ | H04L 63/1441 |
| | | | | 726/23 |
| 2014/0297759 A1* | 10/2014 | Mody | .................... | H04L 51/08 |
| | | | | 709/206 |
| 2014/0331324 A1 | 11/2014 | Stolfo et al. | | |
| 2015/0058978 A1* | 2/2015 | Xiao | ........................ | G06F 21/51 |
| | | | | 726/22 |
| 2015/0096025 A1* | 4/2015 | Ismael | .................. | H04L 63/145 |
| | | | | 726/23 |
| 2015/0121549 A1* | 4/2015 | Baessler | ................. | H04L 63/10 |
| | | | | 726/28 |
| 2015/0149228 A1* | 5/2015 | Papazian | ............ | G06Q 10/1093 |
| | | | | 705/7.18 |
| 2015/0178680 A1* | 6/2015 | Pham | ..................... | G06Q 10/10 |
| | | | | 705/310 |
| 2015/0242371 A1* | 8/2015 | Yu | .......................... | G06F 40/166 |
| | | | | 715/274 |
| 2016/0292420 A1* | 10/2016 | Langton | ................ | G06F 21/567 |

OTHER PUBLICATIONS

Goldberg, Ian et al., "A Secure Environment for Untrusted Helper Applications (Confining the Wily Hacker)", Proceedings of the Sixth USENIX UNIX Security Symposium San Jose, California, Jul. 1996. Ian Goldberg, David Wagner, Randi Thomas, and Eric Brewer Computer Science Division University of California, Berkeley, 14 Pages Total.

ISA, "PCT Application No. PCT/US16/40135 Notification of International Search Report and Written Opinion dated Sep. 19, 2016", 9 pages.

\* cited by examiner

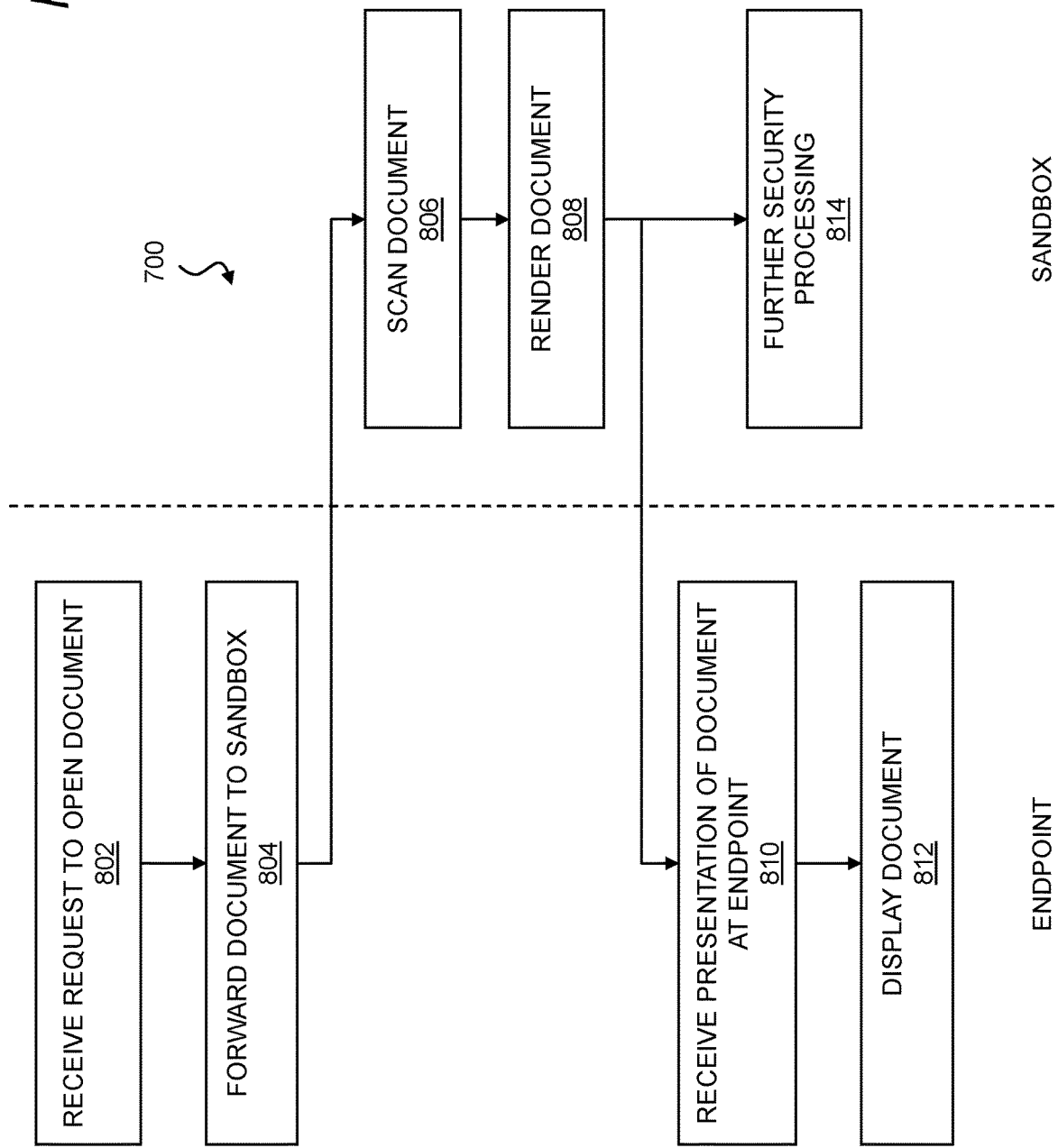

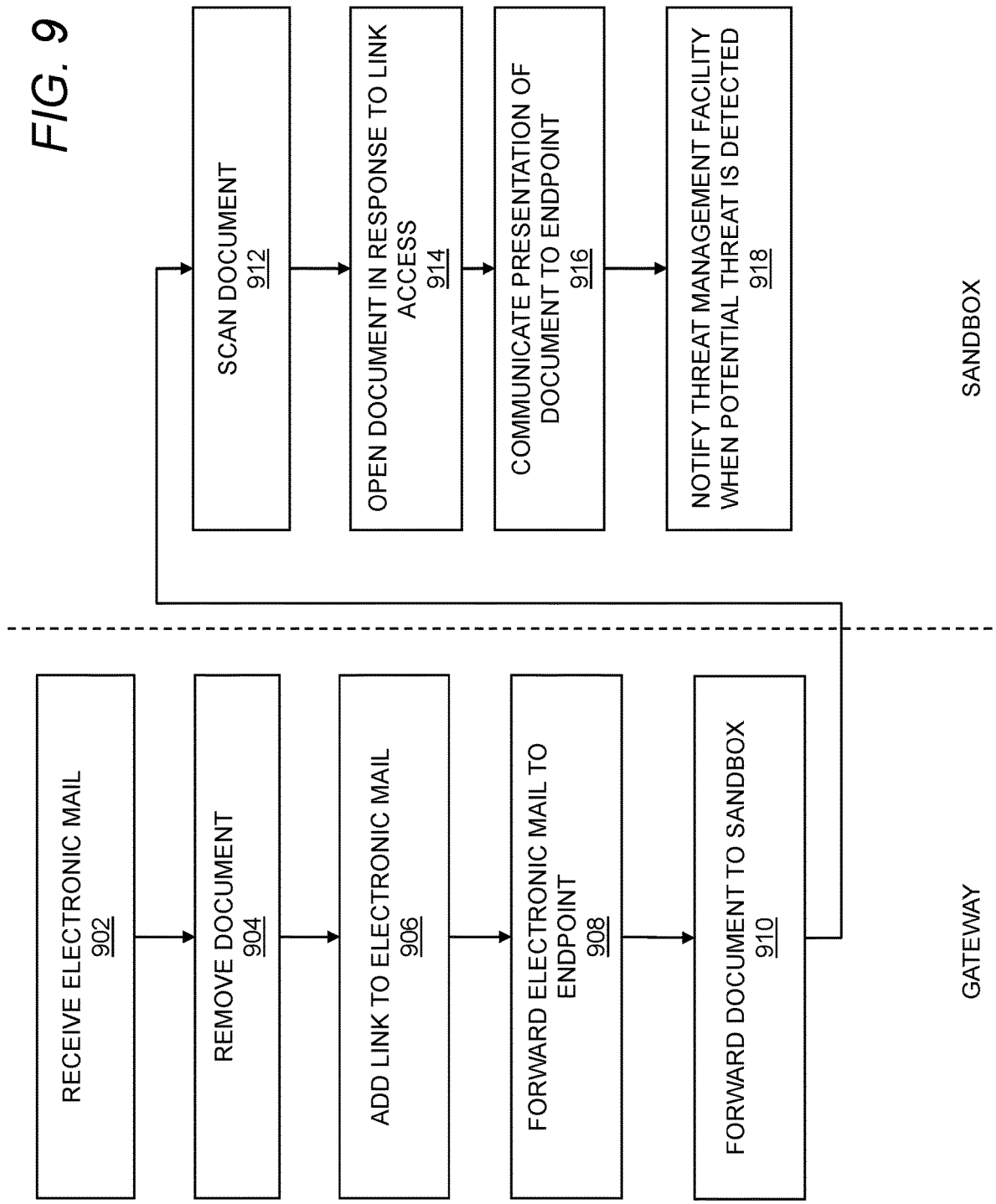

SANDBOX ENVIRONMENT FOR DOCUMENT PREVIEW AND ANALYSIS

CROSS-REFERENCE TO RELATED APPLICATIONS

This application is a national stage entry application of International Patent Application No. PCT/US16/40135 filed on Jun. 29, 2016, the entire contents of which are incorporated herein by reference.

TECHNICAL FIELD

This application relates to the use of a sandbox to preview a document for display on a remote endpoint.

BACKGROUND

Many types of malware can deploy through innocent-looking documents that, when opened on an endpoint, execute or install code to compromise an endpoint. There remains a need for techniques that permit a user of an endpoint user to view electronic mail attachments, web downloads, and the like without exposing the endpoint to malware risks.

SUMMARY

Attachments or other documents can be transmitted to a sandbox environment where they can be concurrently opened for remote preview from an endpoint and scanned for possible malware. A gateway or other intermediate network element may enforce this process by replacing attachments, e.g., in incoming electronic mail communications, with links to a document preview hosted in the sandbox environment.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 8 shows a method for previewing a document in a sandbox.

FIG. 9 shows a method for processing electronic mail for secure viewing.

DETAILED DESCRIPTION

Figure 1:
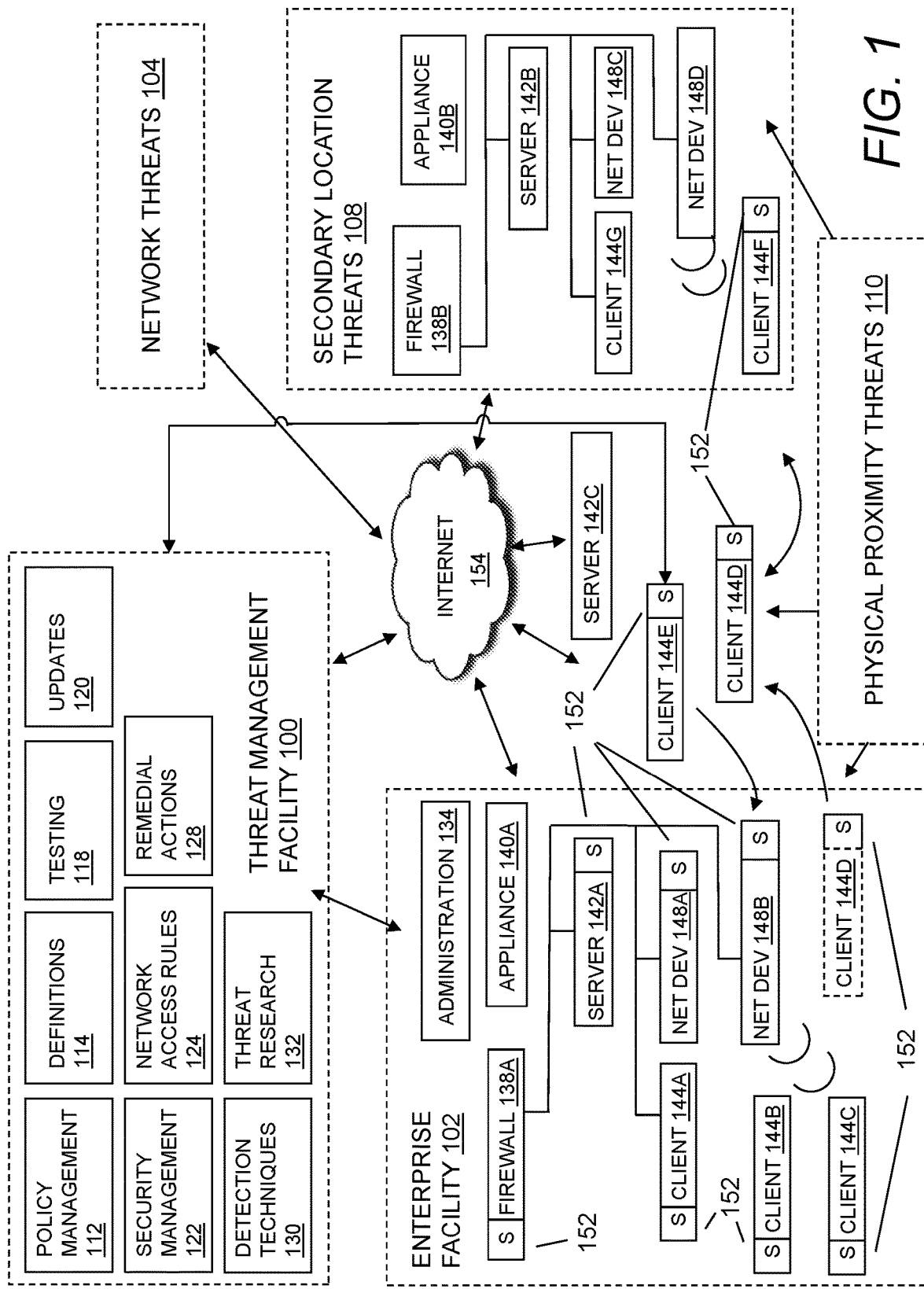
FIG. 1 illustrates an environment for threat management.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

While techniques described herein may emphasize certain network security techniques using firewalls and the like, it will be appreciated that the disclosed systems and methods may be more generally applicable in a wide variety of contexts, including contexts related to security and contexts outside of the realm of network security. In general, the techniques disclosed herein may be usefully employed in any context where a need arises for determining domain names from an Internet Protocol (IP) address. As such, the scope of this disclosure is not limited by the context and examples provided herein, but is intended to include any other adaptations or uses of the disclosed techniques that might be apparent to one of ordinary skill in the art.

An environment for threat management where the devices, systems, and methods discussed herein may be utilized will now be described.

FIG. 1 illustrates an environment for threat management. Specifically, FIG. 1 depicts a block diagram of a threat management system providing protection to an enterprise against a plurality of threats. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities, or the like.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility, the enterprise facility 102 network and/or client facility may pull information from the security facility 122 and policy management facility 112 network server facilities 142, there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

In an embodiment, a definition management facility 114 may provide for the timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility application should be granted access to a requested network location. The network location may be on the same network as the facility or may be on another network. In an embodiment, the network access control may verify access rights for client facilities from within the network or may verify access rights of computer facilities from external networks. When network access for a client facility is denied, the network access control may send an information file to the client facility, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a PDA or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

One way for a client facility to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
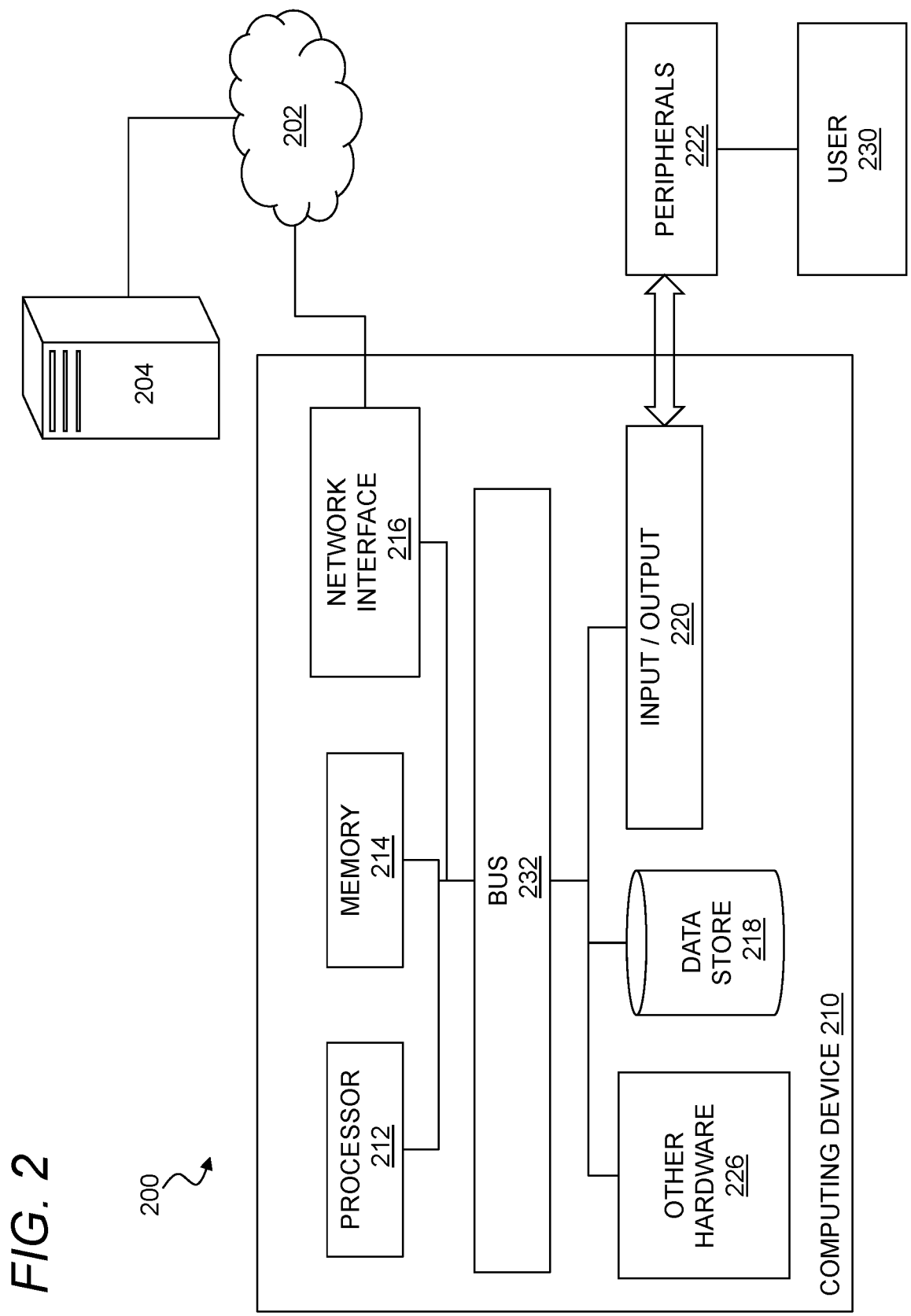
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware (e.g., in a desktop computer), software (e.g., in a virtual machine or the like), or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Having provided an overall context for threat detection and computer systems, the description now turns to devices, systems, and methods for detecting and mitigating anti-sandboxing techniques used by malware.

Figure 3:
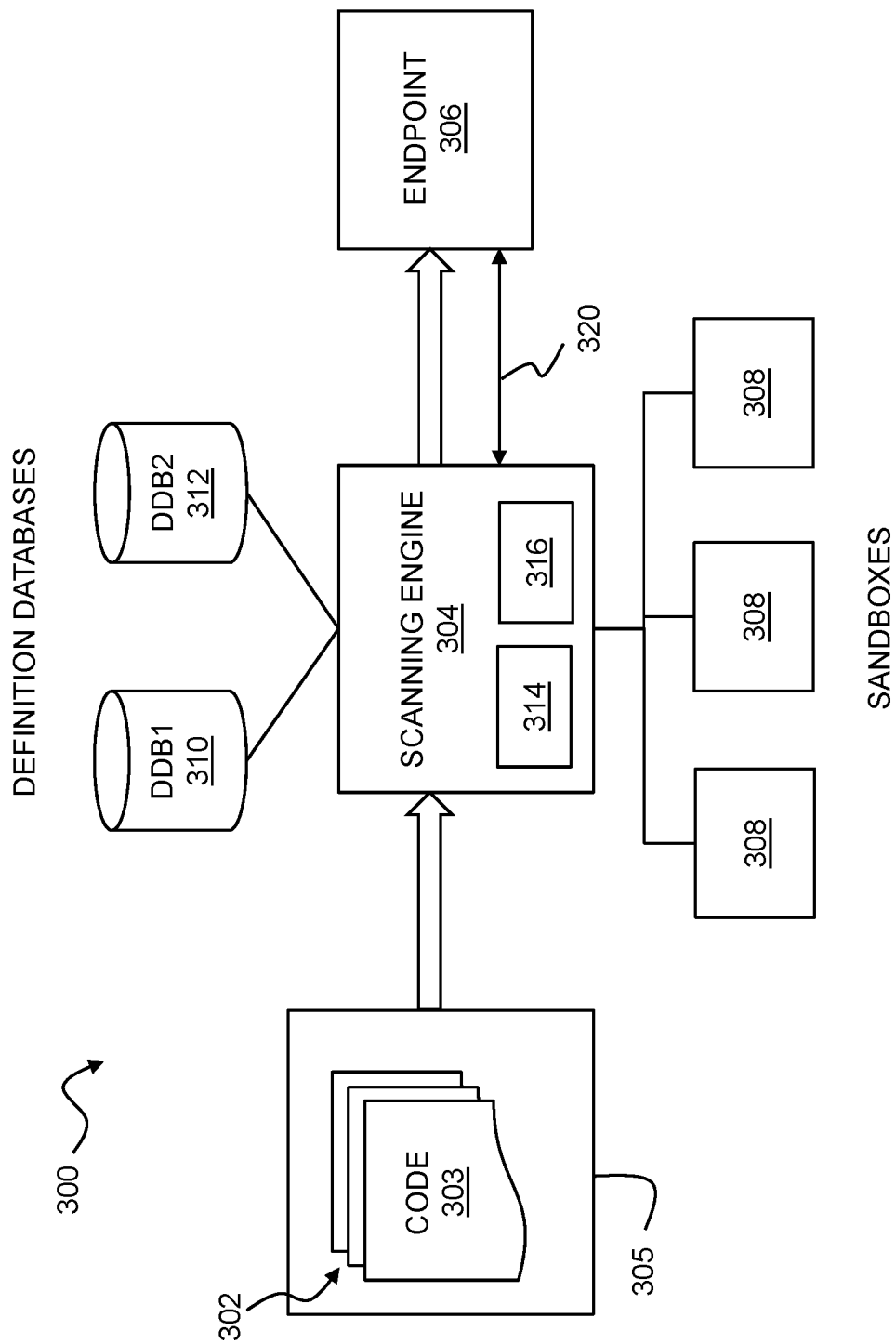
FIG. 3 illustrates an anti-malware system.

FIG. 3 illustrates an anti-malware system. In general, a sandbox provides a contained environment to run, to test, and to analyze unrecognized and potentially malicious code without exposing operational resources if the code is malicious by executing the code and looking for malicious behavior. However, running a software sandbox on a device, for example, in a virtual machine or other virtualized software environment, can be computationally expensive, which may lead to poor performance or interference with operation of the host. Some malware also may attempt to identify the presence of a sandbox or virtualized environment and alter its operational behavior when in a sandbox to avoid detection and analysis. While implementing sandboxes on stand-alone hardware may minimize differences between the sandbox and an ordinary computer environment, this also may impose additional costs when compared to software-only solutions.

In general, a system 300 for combatting anti-sandboxing features may include samples 302 of code 303 in an executable object 305, a scanning engine 304 (including a processor 314 and memory 316), an endpoint 306, one or more sandboxes 308, a first definition database 310 containing definition data for malware detection, and a second definition database 312 containing definition data for anti-sandbox detection. As described in more detail in the processes below, a scanning engine 304 may generally apply static analysis to the samples 302 of code before forwarding the code 302 to an endpoint 306 for execution.

The samples 302 of code 303 may include any form of executable including byte codes, scripts, compiled or uncompiled code, and so forth. One of the samples 302 may be an entire unit of executable code 303 such as an application or script, or the sample 302 may be a functional or structural subportion of the code 303 suitable for static analysis. The code 303 may be or include benign code such as legitimate applications, interactive content, and so forth that might be intended for installation on the endpoint 306, or for transitory execution on the endpoint 306 within a web browser or other client software. In another aspect, the code 303 may be malware such as any of the malicious software content described herein.

The scanning engine 304 may include a processor 314 and memory 316 bearing instructions to perform malware, compromise, and data loss detection and similar functions. In some implementations, the scanning engine 304 may be disposed between an endpoint 306 and a source of the code 303, such as a website, network resource, removable drive, electronic mail message, or the like. This may, for example, include a scanning engine resident on an endpoint, a gateway such as a web gateway or an electronic mail gateway, a firewall, a network switch, a threat management facility, or any other network device or the like positioned between endpoint resources and remote resources. The scanning engine 304 may in general apply static analysis or any other suitable techniques, e.g., using signatures, patterns, feature vectors, and code in the first definition database 310, to detect known and suspected malware in the samples 302 of code 303 and prevent malware from reaching the endpoint 306.

The endpoint 306 may, for example, include any of the endpoints described above such as a mobile phone, laptop computer, tablet, desktop computer, server, and so forth. More generally, any device suitable for connection to a data network or having a data interface may be an endpoint 306 as contemplated herein. In general, an endpoint 306 may be vulnerable to malware that might be received over a network or other communications channel.

The sandboxes 308 may include one or more software sandboxes configured to execute the code 303, or samples 302 of the code 303 in a contained environment so that the endpoint 306 or other computing resources are not exposed to harmful or destructive functions of malicious software. Thus, while the scanning engine 304 may generally perform static analysis based on any observable traits of the code 303 or samples 302 thereof, the sandboxes 308 can facilitate dynamic analysis of the code 303 by actually executing the code 303 in a safe environment isolated from endpoints 306 or other enterprise participants. In one aspect, the sandboxes 308 may include virtual sandboxes that can, e.g., be created in a virtual environment on demand as sandbox analysis needs arise. A virtual sandbox may be instrumented to detect various types of malicious behavior typical of malware. The sandboxes may be instrumented more specifically detect at least one known anti-sandbox malware component, or to disguise virtualization by mimicking environmental variables and other characteristics of hardware. In another aspect, the sandboxes 308 may include one or more hardware sandboxes dedicated to contained code analysis as contemplated herein. In another aspect, as described below, a number of different types of sandboxes may be provided so that the scanning engine 304 can select a specific type of sandbox to analyze sample 302 based on the results of static analysis and any other available information.

The definition databases may include a first definition database 310 containing signatures, patterns, feature vectors, and code for identifying malware that the scanning engine 304 can use to perform static analysis of the code 303. The first definition database 310 may be updated from time to time or periodically as information about new threats becomes available. It will be understood that while static analysis provides one useful form of malware detection for use by the scanning engine 304, other techniques may also or instead be employed. The second definition database 312 may store different types of signatures, patterns, feature vectors, and code specifically, signatures, patterns, feature vectors, and code that may be used to detect anti-sandbox operations that may be used in malware to avoid detection when executing in a sandbox environment. A simple example of an anti-sandbox operation is code that provides a long delay before performing an exploit or other malicious operation. This anti-sandbox operation may be intended to simply out-wait the time that code is typically run in a sandbox analysis and avoid detection by delaying launch of an exploit or other malicious operation until after a sandbox typically has stopped analyzing. The second data definition database 312 may include signatures, patterns, feature vectors, or code that enables looking for code or operations that may delay certain operations. It will be appreciated that the first definition database 310 and the second definition database 312 may be deployed as a single, integrated definition database, although the signatures, patterns, feature vectors, and code in each case are directed toward detecting different types of malicious code.

In one aspect, the system 300 may include a communication link 320 for bidirectional communications between the endpoint 306 and the scanning engine 304. This may, for example, include a network connection or, where the scanning engine 304 is resident on the endpoint 306, a software API or the like. In general, the communication link 320 may be used by the scanning engine 304 to query the endpoint 306, e.g., so that the scanning engine 304 can obtain configuration information from the endpoint 306 in order to select or create a suitable sandbox for testing suspected malware as contemplated below, or to forward a software object to the endpoint 306 for execution after scanning has been completed.

Figure 4:
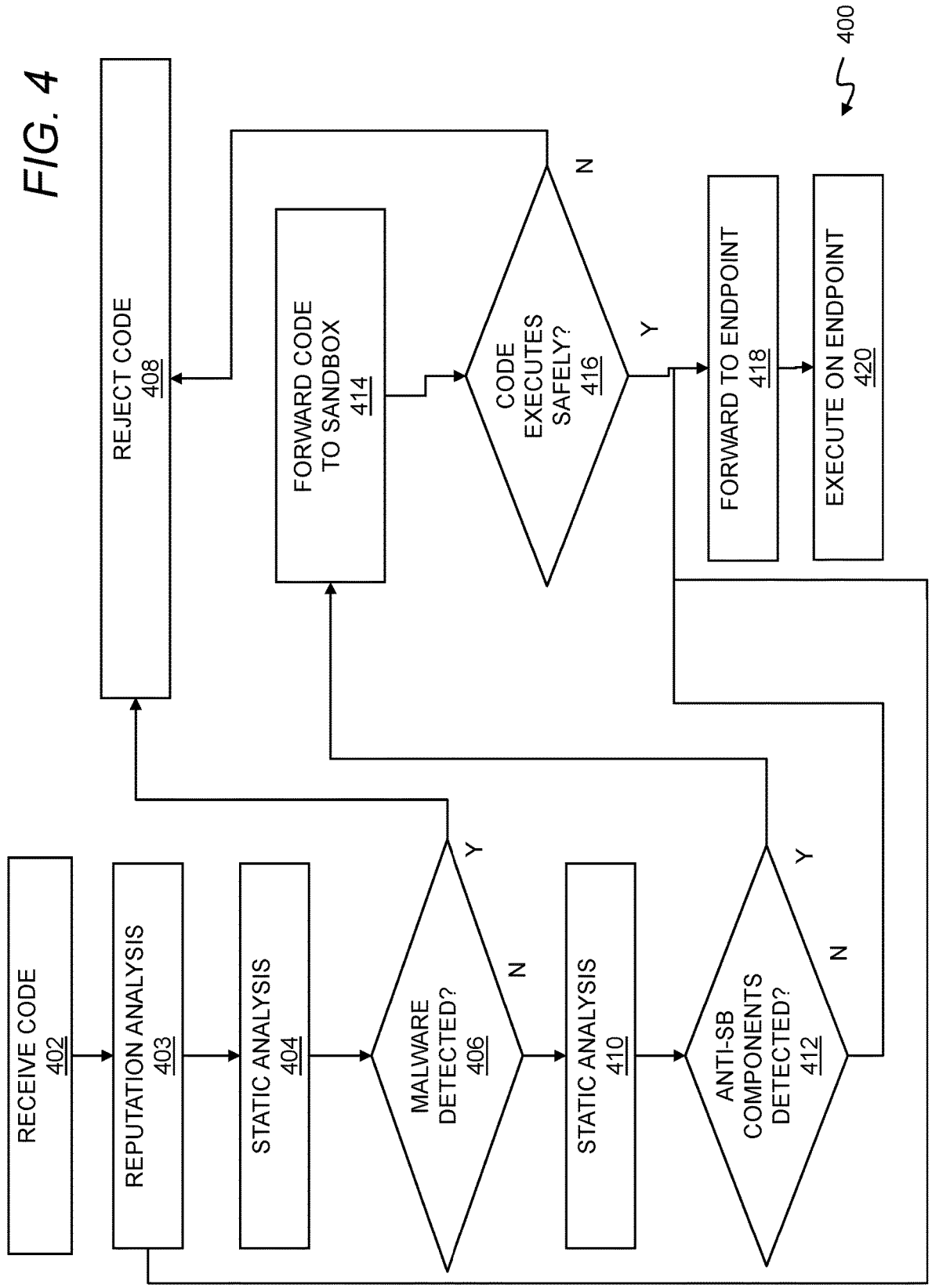
FIG. 4 shows a process for addressing anti-sandboxing malware techniques.

FIG. 4 shows a process that may be used to counter anti-sandboxing operations in malware. The scanning engine and other components described herein may be employed in a process 400 for securing an endpoint against malware that contains sandbox detection operations. In general, in some implementations, the process 400 may include a combination of static analysis targeting malware with static analysis targeting anti-sandbox operations so that resource intensive sandboxing can be reserved for suspicious code, for example, code that may be directed to avoiding sandbox-based detection.

As shown in step 402, the process 400 may begin with receiving a sample of a software object. The software object may be any computer object. For example, the software object may include one or more of a file, a document, an application, a media file, a compressed file or library of files, an electronic mail, an attachment, a script, an application, or any other document, file or item of executable code. The sample may include any portion or subportion of a code object, or an entire, self-contained unit of executable code, all according to the configuration and capabilities of a scanning engine that will perform static analysis. More generally, the sample may include all of the software object or any representative portion of the software object suitable for static analysis as contemplated herein.

As shown in step 403, the process 400 may include performing a reputation analysis of the sample in order to detect a known, safe software object that can be executed on the endpoint without further analysis. For example, reputation may indicate one or more of prevalence, for example, how popular is it and how often is it seen on other devices, provenance, for example, where did it come from (e.g., from a web site, from an email, from an operating system update), and pedigree (e.g., who was the author or developer, is it signed, and is the signature valid). This step may usefully be performed prior to the first static analysis, prior to the second static analysis, or at any other time where computing resources might usefully be conserved by pre-identifying safe software components from trusted sources. Reputation analysis may employ any suitable techniques known in the art for identifying safe software and/or trusted source. For example, the reputation analysis may include an analysis of at least one digital signature of the software object that verifies an origin of the software object, or an analysis of a source or sender of the software object. Where a software object is determined to be safe, the process 400 may proceed directly to step 418 where the software object is forwarded to an endpoint as described below. Otherwise the process 400 may proceed to step 404.

As shown in step 404, the process 400 may include performing a first static analysis of the sample using one or more data definitions associated with malware. This may include any suitable form of static analysis using, e.g., the signatures, patterns, feature vectors, and code in a definitions database, which may be performed by the scanning engine described above, or any other suitable hardware/software.

As shown in step 406, the static analysis may evaluate whether malware is detected based on, e.g., portions of the sample and signatures, patterns, feature vectors, and code in a definitions database, or any other suitable static analysis or similar process.

As shown in step 408, when malware is detected in the first static analysis, the method 400 may include flagging a software object containing the sample for use on the endpoint. This may include deleting the software object, forwarding the software object to a remote resource for further analysis, reporting receipt of the software object to a remote resource, or otherwise recording, analyzing, or reporting on the detection of the malware. When malware is not conclusively detected, the process 400 may proceed to step 410.

As shown in step 410, when malware is not conclusively detected in the first static analysis, the process 400 may include performing a second static analysis of the sample using one or more signatures, patterns, feature vectors, and code associated with anti-sandbox operations. This may include identifying components that may be used by malware to evade detection specifically when executing in a sandbox environment. For example, this may include identifying one or more byte sequences known to be associated with anti-sandbox operations or feature vectors known to be associated with anti-sandbox operations. Other techniques may also or instead usefully be employed to detect anti-sandbox operations.

In general, some anti-sandbox operations may include determining whether code is operating in a virtual machine. Code that measures or exploits differences in the configuration or operation of virtualized environments as compared to non-virtualized environments, may serve as the basis for anti-sandbox operations. Signatures, patterns, feature vectors, and code may be provided in a definitions database for recognizing operations that are intended to determine whether the code is operating in a virtualized environment. For example, a code sample that explicitly searches for files, registry entries, or other objects commonly found in a virtualized environment might be considered suspicious, and suitable signatures, patterns, feature vectors, and code may identify such operations. Similarly, signatures, patterns, feature vectors, and code may detect unusual, undocumented or invalid instruction sequences or API parameters that appear intended to be incorrectly handled or handled differently within a virtualization environment. For example, signatures, patterns, feature vectors, and code may detect sequences of operations that will experience significant execution delays in a virtualized environment, that query hardware system information (CPU details, MAC addresses) that do not exist in a virtualized environment, or that request handles for system objects that do not exist under virtualization, or that may not be fully emulated/simulated in a virtual environment.

As another example, anti-sandbox operations may include delaying operation of an exploit longer than the time that a sample is typically run in a sandbox. Signatures, patterns, feature vectors, and code in a definitions database may detect instructions or sequences of instructions that appear intended to delay execution, e.g., to outwait sandbox testing, or that will take significantly different lengths of time under different circumstances.

As shown in step 412, the second static analysis may evaluate whether a suspected anti-sandbox operation is present. The anti-sandbox operation may be any code configured to detect when it is executing in a sandbox and evade detection. This may, for example include an operation configured to detect one or more aspects of a virtualized environment or other sandbox environment, and to avoid detection when executing within such an environment, etc. In some implementations, the result of a positive result in the second static analysis is that the sample is run in a sandbox. As this does not convict the sample as malware, the false positive rate in the second static analysis may be higher than in the first static analysis without concerning users. This may enable the second static analysis to be more sensitive than the first with respect to detecting anti-sandbox operations that may be suspicious.

When a suspected anti-sandbox operation is detected in the second static analysis, the process 400 may include forwarding the sample to a sandbox environment for execution and testing as shown in step 414. In one aspect, this technique may more specifically be used as a filter for using hardware sandboxes. That is, when certain software components are detected, they will be specifically directed to a hardware sandbox, so that static analysis can be effectively applied as a filter for hardware sandboxing. Otherwise the code may be forwarded to an endpoint as shown in step 418.

As shown in step 416, the forwarded code sample received at the sandbox may be evaluated within the sandbox to determine whether the code is malicious.

When no anti-sandbox component is detected, the process may include permitting the software object to be processed on the endpoint. This may generally include forwarding the software object containing the code to the endpoint as shown in step 418, and then executing the software object on the endpoint, as shown in step 420. This may include forwarding the software object from an intermediary such as a firewall, gateway (e.g., an electronic mail gateway or a web gateway), a threat management facility, or other network component that executes the scanning engine for static analysis. Where some or all of the static analysis is performed on the endpoint, this may alternatively include releasing the software object from an antivirus engine or other scanning engine or the like executing on the endpoint.

If the code does not execute safely in the sandbox in step 416, e.g., if some malicious behavior or result is observed, then the process may proceed to step 408 and the code may be flagged or convicted as malware. It will be understood that malicious behavior may not be specifically observed in all instances. For example, if an application is observed to launch and then exit quickly without performing any useful function, a strong inference may be made that the code has detected a sandbox and aborted execution. This code may be rejected, or the code may be flagged for further analysis. Where strong indications of malicious behavior are found but not confirmed in this context, the code may be redirected to a hardware sandbox, e.g., using the techniques described below.

It will be appreciated that the size of code samples analyzed within a software object, and the number of signatures, patterns feature vectors, and code applied, may vary according to the granularity of the analysis system. In some circumstances, it may be appropriate to analyze an entire software object at one time. In other circumstances, it may be appropriate to analyze small, individual samples of code in sequence or in parallel. Similarly, steps may be rearranged, such as by performing sandbox component analysis first, followed by more general malware static analysis, or these steps may be combined into a single signature-based static analysis. Thus the steps may be repeated and/or reorganized as appropriate according to the process flow of a scanning engine and other system components performing the depicted process, and no particular order of these scanning steps should be inferred from the presentation of steps in FIG. 4.

The process described above may also or instead be realized in computer code, or in device or system such as any of those described above configured to perform the steps above. Thus in one aspect, disclosed herein is a computer program product for securing an endpoint against malware that contains sandbox detection mechanisms, the computer program product comprising computer executable code embodied in a non-transitory computer readable medium that, when executing on one or more computing devices, performs the steps of receiving a sample of a software object over the network, performing a first static analysis of the sample using one or more signatures of known malware, when malware is detected in the first static analysis, rejecting a file containing the sample for use on the endpoint, when malware is not detected in the first static analysis, performing a second static analysis of the sample using one or more signatures of known anti-sandbox components, when an anti-sandbox component is detected in the second static analysis, forwarding the sample to a sandbox environment for execution and testing, and when no anti-sandbox component is detected, permitting the software object to be processed on the endpoint.

In another aspect, disclosed herein is a system for securing an endpoint against malware that contains sandbox detection mechanisms, the system including a computing device coupled to a network; a processor; and a memory bearing computer executable code configured to be executed by the processor to cause the computing device to perform the steps of receiving a sample of a software object over the network, performing a first static analysis of the sample using one or more signatures of known malware, when malware is detected in the first static analysis, rejecting a file containing the sample for use on the endpoint, when malware is not detected in the first static analysis, performing a second static analysis of the sample using one or more signatures of known anti-sandbox components, when an anti-sandbox component is detected in the second static analysis, forwarding the sample to a sandbox environment for execution and testing, and when no anti-sandbox component is detected, permitting the software object to be processed on the endpoint.

Figure 5:
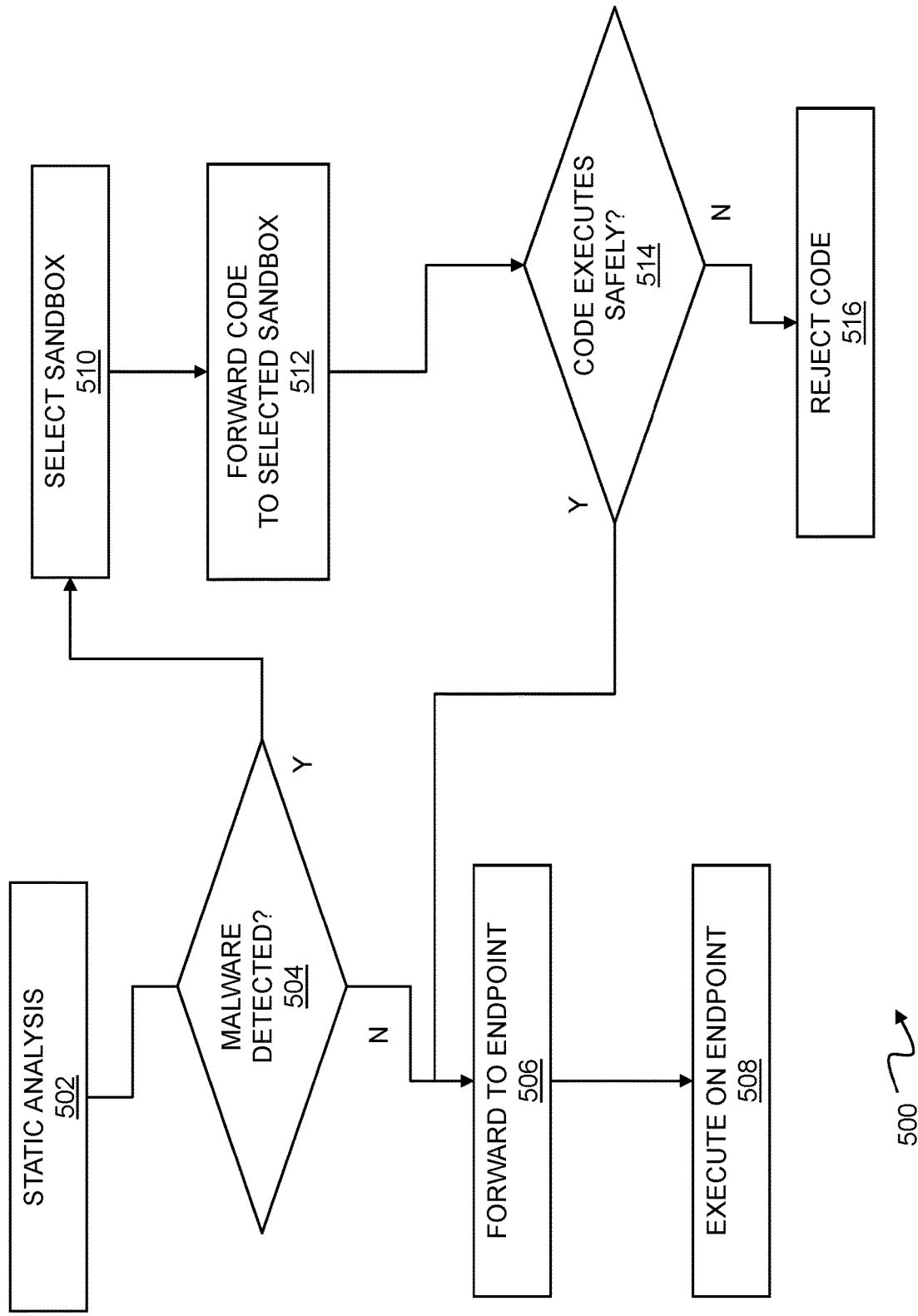
FIG. 5 shows a process for addressing anti-sandboxing malware techniques.

FIG. 5 shows a process for addressing anti-sandboxing malware techniques. While the above process contemplates the use of static analysis to detect known anti-sandbox components, the process may be further enhanced by using static analysis to select a specific type of sandbox for further analysis. Thus for example, in some instances where a particular vulnerability is likely being exploited, a specifically-tailored virtual sandbox environment may be created to examine a particular behavior, while in other instances where a virtualization environment itself may be detected by a sample, a physical sandbox may instead be deployed to test the suspicious code.

As shown in step 502, the process 500 may begin with performing a static analysis of a sample of a software object using one or more signatures of one or more known malware objects, such as known malicious code or code containing anti-sandbox features. In general, static analysis may be applied to identify known malware based on signatures, patterns, feature vectors, code, or the like. The static analysis may also or instead include static analysis on unrecognized software objects based on patterns or arrangements of code that appear suspicious. Thus any known malware object, or recognizable pattern of potentially malicious components in an object, may be used as a basis for performing static analysis. For example, a known malware object may include a virtual environment detection component, a sandbox detection component, a hardware-specific exploit, a software-specific exploit, or any combination of these. Similarly, the known malware object may include an operating system exploit, an application exploit, or any other exploit that capitalizes on potential vulnerabilities in hardware, a kernel, an operating system, an application, or some combination of these. The detection of these and other suspicious patterns may be used as a basis for further action as contemplated herein.

A computing device receiving the software object may be coupled to a network and the software object may be received over the network, such as from a gateway, firewall, switch, remote server, or other network resource. In another aspect, the software object may be received locally such as from a flash drive or other removable or portable memory device that is coupled to a computer, or through a short range wireless communication interface using, e.g., radio frequency, infrared, or any other optical, acoustic, or electrical communication medium. For example, Bluetooth is a short range, radio frequency communication standard that might usefully be employed to transfer files among devices, and may be a source of a software object received on a computer or computing device.

As shown in step 504 the static analysis may determine if malware is detected. In this context, malware may include specific instances of known malware, or malware may include, e.g., code characteristic of malware, code characteristic of anti-sandbox techniques or the like that is suspected of being malware and requiring additional analysis.

If malware is not detected in step 504, then the process may include forwarding the software object to an endpoint as shown in step 506. As described above, this may include forwarding the software object from a remote location such as a firewall, gateway, or the like, or this may include releasing the software object from a scanning engine executing on the endpoint. In either case, the process 500 may include executing the software object on the endpoint as shown in step 508. If during step 504 malware or potential malware is detected, then the process 500 may proceed to step 510.

As shown in step 510, the process 500 may include selecting from among a plurality of available sandbox environments to process the software object for malware testing (by executing the software object in the sandbox). The plurality of available sandbox environments may include any number and configuration of sandboxes. For example, the available sandbox environments may include a hardware sandbox, a sandbox with a predetermined operating system, a sandbox with a predetermined software configuration, a virtual sandbox instrumented to detect at least one known anti-sandbox component, or any other sandbox environment or the like that is tailored to a particular type of malware detection, as well as any combination of the foregoing. In one aspect, sandboxes may be provided for different hardware platforms, such as desktop computers, laptop computers, smart phones, and tablets, or with still more granularity for different devices such as versions of Android phones, Apple phones, and Windows phones. Similarly, sandboxes may be provided for different operating system versions, installed application suites, file types or application versions. For example, where static analysis identifies what appears to be a known exploit for a particular version of an application, a virtual environment with that specific version of the application may be instantiated and used to open or run the suspicious software object.

In one aspect, a number of different sandboxes may be applied in sequence. That is, where a particular software object cannot confidently be categorized as safe or unsafe, the code may be transferred to another sandbox for further testing. Thus for example, a virtual sandbox may be applied first, and then a (more expensive) hardware sandbox may be used next if the code contains suspected malware or anti-sandbox components, but did not exhibit any malicious behavior in a particular virtualized sandbox environment. In this manner, the most expensive resources may be conserved for those cases that require a particular environment, e.g., a hardware sandbox, for proper identification.

As shown in step 512, after a suitable sandbox has been selected, the process 500 may include forwarding the software object to the selected sandbox. As shown in step 514, the code may be observed while executing in the sandbox to determine whether the code executes safely. If the code executes safely, then the process 500 may proceed to step 506 where the software object is forward to an endpoint for execution.

As shown in step 516, if the software object does not execute safely, then the software object may be rejected. This may include any number of additional analysis or handling steps. For example, the process 500 may optionally return to step 510 where a different sandbox may be selected, particularly where the code analysis is inconclusive. In another aspect, where the code is rejected, the code may further be flagged and/or forwarded to an analysis facility for further processing, the development of new signatures for improved downstream detection, and so forth. More generally, any techniques useful for handling, cataloguing, mitigating, or otherwise dealing with rejected code may be applied in step 516 as contemplated herein.

Figure 6:
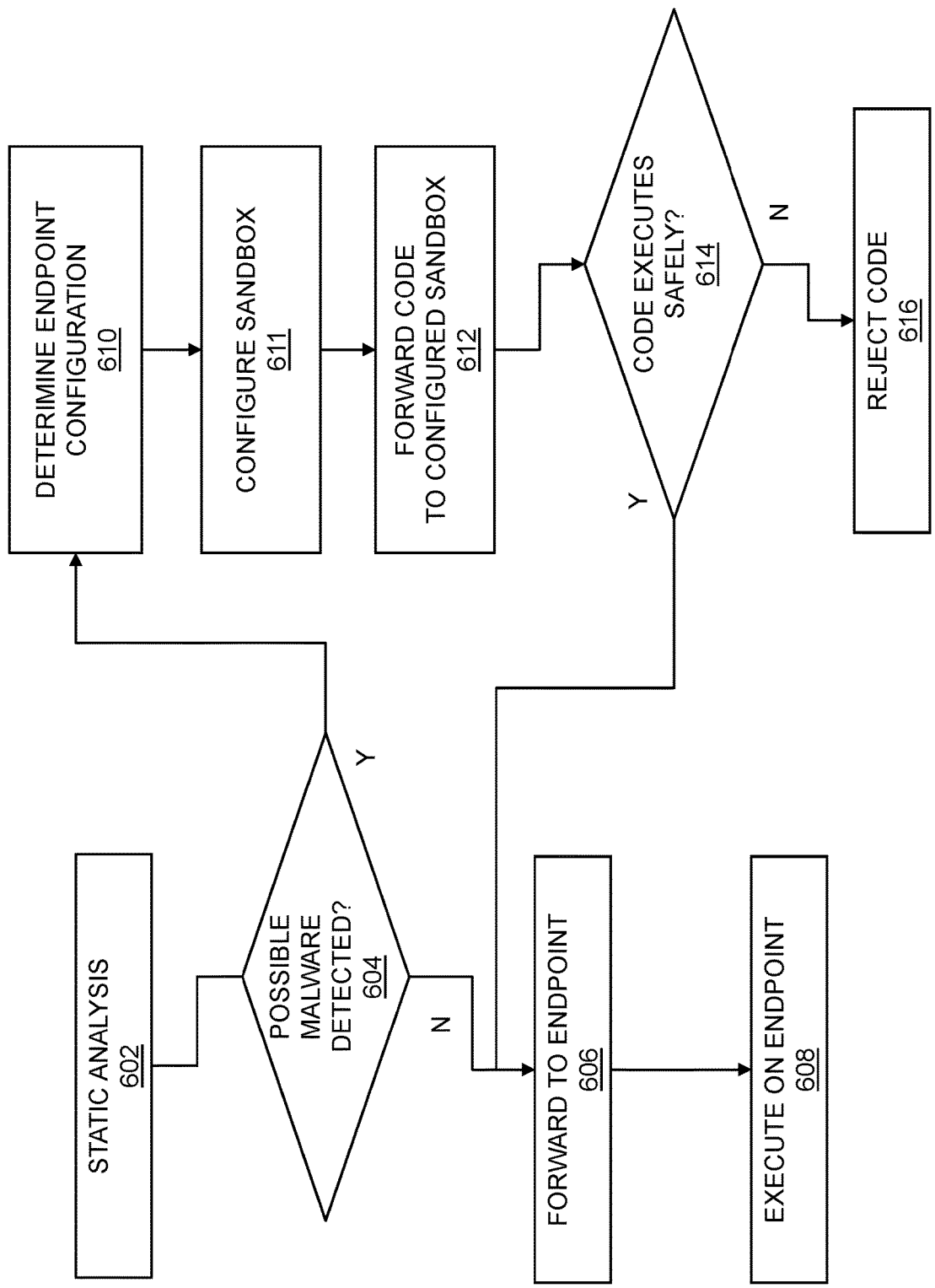
FIG. 6 shows a process for configuring a sandbox for malware testing to correspond to a target endpoint.

FIG. 6 shows a process for configuring a sandbox for malware testing to correspond to a target endpoint. In general, this process 600 may proceed as described above with reference to FIG. 5, except that a sandbox is configured to specifically match a target endpoint in order to improve chances for detection of relevant malicious behavior. Thus for example, in some instances where a particular vulnerability of a particular platform is likely being exploited, a specifically-tailored virtual sandbox environment may be created or selected to match the target environment.

As shown in step 602, the process 600 may begin with performing a static analysis of a sample of a software object using one or more signatures, patterns, feature vectors, or code, for example, from a definitions database, to identify one or more suspected malware objects, such as known or suspected malicious code or code containing identifiable features of malware. In general, static analysis may be applied to identify known or suspected malware based on signatures, patterns, feature vectors, code or the like. The static analysis may also or instead include recognizing patterns or arrangements of code that have been seen previously or appear suspicious. Thus static analysis may attempt to recognize portions or features of any known malware object, or a recognizable pattern of potentially malicious operations. For example, a suspicious object may include one or more of a hardware-specific exploit, a software-specific exploit, a virtual environment detection component, a sandbox detection component, or any combination of these. Similarly, a malware object may include an operating system exploit, an application exploit, or any other exploit that capitalizes on potential vulnerabilities in hardware, a kernel, an operating system, an application, or some combination of these. The detection of these and other suspicious components may be used as a basis for further action as contemplated herein.

A computing device receiving the software object may be coupled to a network and the software object may be received over the network, such as from a gateway, firewall, switch, remote server, or other network resource. In another aspect, the software object may be received locally such as from a flash drive or other removable or portable memory device that is coupled to a computer, or through a short range wireless communication interface using, e.g., radio frequency, infrared, or any other optical, acoustic, or electrical communication medium. For example, Bluetooth is a short range, radio frequency communication standard that might usefully be employed to transfer files among devices, and may be a source of a software object received on a computer or computing device.

As shown in step 604 the static analysis may determine if malware is detected. In this context, malware may include specific instances of known malware, or malware may include, e.g., code characteristic of anti-sandbox techniques or the like that is suspected of being malware and requiring additional analysis.

If malware is not detected in step 604, then the process may include forwarding the software object to an endpoint as shown in step 606. As described above, this may include forwarding the software object from a remote location such as a firewall, gateway, or the like, or this may include releasing the software object from a scanning engine executing on the endpoint. In either case, the process 600 may include executing the software object on the endpoint as shown in step 608. If during step 604 malware or any possible malware object is detected, then the process 600 may proceed to step 610.

As shown in step 610, the process 600 may include determining a configuration of a target endpoint for the software object. This may, for example, include querying the target endpoint for configuration information, or using any other techniques to determine a configuration of the endpoint such as by requesting information stored in a threat management facility or other repository of configuration information, software updates, and the like for an enterprise. More generally, any technique for directly or indirectly determining the configuration of an endpoint may be used. The configuration may, for example include an operating system configuration, a hardware configuration, an application configuration, and so forth. Other information may also usefully by detected and reproduced in order to create an environment more closely matching a target endpoint, such as a MAC address, an IP address, and so forth. This information may be passed to a sandbox environment as context data, or may be used to create a new sandbox.

As shown in step 611, the process 600 may include configuring a sandbox to match the configuration of the target endpoint. This may include creating a new sandbox (e.g., a new virtual machine) corresponding to the configuration of the target endpoint, or dynamically configuring an existing sandbox environment to replicate some, many, or all aspects of the target endpoint. Where an existing sandbox is dynamically configured, this may, for example, include installing software on a preexisting virtual machine to match a software configuration of the target endpoint including, without limitation, installed applications, an operating system and updates to same, and so forth. Where a hardware sandbox is desired, the hardware sandbox may be similarly configured dynamically to more closely correspond to the environment of the target endpoint.

It should be appreciated that this technique may also or instead be used in combination with the process 500 described above with reference to FIG. 5. That is, after a configuration of the target endpoint has been determined, this information may be used to select from among a number of preexisting sandboxes—preferably one most closely matching the target environment—rather than instantiating a new sandbox according to characteristics of the target endpoint. In either case, a suitable sandbox may be created or selected as contemplated herein.

As shown in step 612, after a suitable sandbox has been instantiated, the process 600 may include forwarding the software object to the created sandbox. As shown in step 614, the code may be observed while executing in the sandbox to determine whether the code executes safely. If the code executes safely, then the process 600 may proceed to step 606 where the software object is forward to an endpoint for execution.

As shown in step 616, if the software object does not execute safely, then the software object may be rejected. This may include any number of additional analysis or handling steps. For example, the process 600 may optionally return to step 610 where a different sandbox may be or created, particularly where the code analysis is inconclusive. In another aspect, where the code is rejected, the code may further be flagged and/or forwarded to an analysis facility for further processing, the development of new signatures for improved downstream detection, and so forth. More generally, any techniques useful for handling, cataloguing, mitigating, or otherwise dealing with rejected code may be applied in step 616 as contemplated herein.

The process described above may also or instead be realized in computer code, or in device or system such as any of those described above configured to perform the steps above. Thus in one aspect, disclosed herein is a computer program product comprising computer executable code embodied in a non-transitory computer readable medium that, when executing on one or more computing devices, performs the steps of performing a static analysis of a sample of a software object using one or more signatures of one or more known malware objects, and when the static analysis identifies one of the one or more known malware objects, selecting a sandbox environment from among a plurality of available sandbox environments to process the software object for malware testing.

In another aspect, a system disclosed herein includes a computing device coupled to a network, a processor, and a memory bearing computer executable code configured to be executed by the processor to cause the computing device to perform the steps of receiving the software object over a network, performing a static analysis of a sample of a software object using one or more signatures of one or more known malware objects, and when the static analysis identifies one of the known malware objects, selecting a sandbox environment from among a plurality of available sandbox environments to process the software object for malware testing. The computing device may be any enterprise device or the like. For example, the computing device may be an electronic mail gateway to an enterprise network that receives electronic mail and applies static analysis before forward messages to endpoints. The computing device may also or instead include a firewall to an enterprise network, a threat management facility for the enterprise network, or any other participant in an enterprise network. In one aspect, the computing device may be an endpoint in the enterprise network, and may locally execute signature-based analysis to select an appropriate sandbox for unrecognized but suspicious malware.

Figure 7:
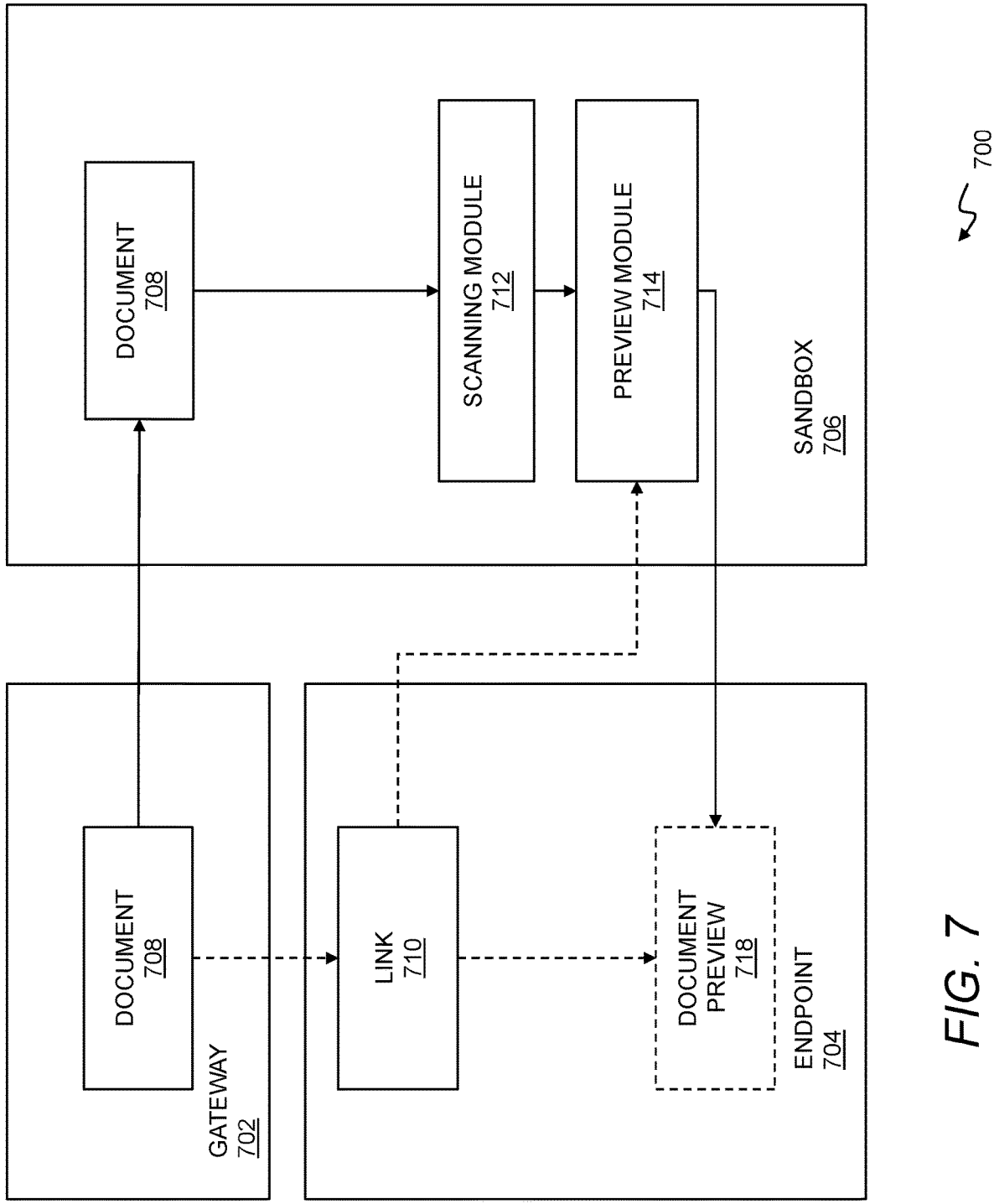
FIG. 7 shows a system for previewing a document in a sandbox.

FIG. 7 shows a system 700 for previewing a document in a sandbox. In general, the system may include a gateway 702, and endpoint 704, and a sandbox 706, which may include any of the gateways, endpoint and sandboxes described herein.

The sandbox 706 may include any of the sandboxes described herein, including without limitation a sandbox executing on (or locally coupled to) a gateway for an enterprise network that includes the endpoint, or a firewall for the endpoint 704. Although depicted as a separate component, the sandbox 702 may include a virtual machine executing on the endpoint 704 or on the gateway 702. More generally, any configuration safe for execution and diagnosis of potentially malicious software may be used as a sandbox 706 as contemplated herein.

In general, a document 708 may be accessed by the endpoint. This may, for example, include a document 708 that is an attachment to an electronic mail communication or otherwise communicated to the endpoint 704 over a network. Thus, while illustrated as residing on the gateway 702, it will be understood that an instance of the document 708 may also or instead be present on an electronic mail server or other messaging infrastructure, and the gateway 702 (or other intermediate infrastructure) may replace the document 708 with a link for consumption by the endpoint 704. When the link is activated at the endpoint, a browser or other client may access the preview module 708 on the sandbox 706, which may render the document preview 718 for the endpoint 704 in any suitable form, such as by presentation within a browser window, presentation through a VPN, or using any other suitable remote document viewing or sharing techniques. For electronic mail, the link 710 can be conveniently substituted for the document 708 in an attachment. However, the system 700 may also or instead be used for local file previewing on an endpoint 704, such as with a right click "secure preview" action that transmits the document 708 from the endpoint 704 to the sandbox 706 for previewing as otherwise contemplated herein.

The link may be any suitable link such as hyperlink formatted according to the hypertext transfer protocol or the hypertext transfer protocol using secure sockets layer or transport layer security. This may also or instead include any address or other identifier or pointer that can be used by the endpoint 704 to connect to a document preview 718 that is being rendered by the sandbox 706.

The scanning module 712 may be any suitable antimalware detection component or combination of components suitable for static analysis, dynamic analysis, or any other type of analysis, scanning, intrusion prevention or other threat detection technique or combination of techniques that might be suitably applied to evaluate a document for potential security threats.

A preview module 714 may be executing on the sandbox 706 before, concurrently with, or after the scanning module 712, and may serve to provide a preview of the document 708 suitable for rendering on the endpoint 704. The preview module 714 may, for example, include a full instance of an application used to open the document, along with software for keyboard-video-mouse interaction with the document from the endpoint 704. The preview module 714 may instead include a limited-functionality application that permits viewing of the document 708, but not editing, saving or other actions. In general, the preview module 714 may support limited or full interaction with the document 708 including, e.g., viewing multimedia, text, layout, vector graphics, and so forth as though the document had been opened for viewing on the endpoint 704.

Using this platform, a user at an endpoint 704 may advantageously view and browse the contents of document 708 without exposing the endpoint 704 to potentially harmful content, while concurrently scanning the document 708 for potential threats before permitting the document 708 to be retrieved to and/or opened on the endpoint 704.

FIG. 8 shows a method 800 for previewing a document in a sandbox. In general, a sandbox may be used to remotely and safely open a document and provide a preview to an endpoint, while also scanning the document for potential security threats using any suitable malware detection techniques or the like.

As shown in step 802, the method 800 may begin with receiving a request at an endpoint to open a document. This may for example include a document attached to an electronic mail message or any other attachment to an electronic communication such as a text message, a multimedia message, or any other communication that might be received at the endpoint. A document may also or instead be electronically received through another medium such as a manual download from a website, a document shared through a conference call platform, an interaction with a social networking platform and so forth. The document may also or instead include a document locally stored on the endpoint, in which case the request may be received through a right-click selection of an icon for the file or some other local file interaction on the endpoint. In another aspect, the document may include a remote document identified by a uniform resource locator or other network address or the like, in which case a user of the endpoint may request sandbox analysis within a browser window or the like before downloading the file to the endpoint.

The document may generally be any file or document type including without limitation a word processing document, a spreadsheet, a portable document format document, or a presentation document. Other files or documents may also or instead be included as attachments such as electronic business cards, hypertext markup language documents, a flash media documents, scripts, multimedia files (audio, video, pictures, etc.), plaintext documents and so forth.

The request to open the document may take a variety of forms. In one aspect, a selection of an attachment within an electronic mail or the like may trigger further action as contemplated herein, such as by transmitting the document to the sandbox and displaying the remotely rendered document at the endpoint. Where an electronic mail inbox is locally administered, e.g., with a local email client, the request to open the document may be in the form of an automated request from a background process that is configured to scan the electronic mail inbox for attachments. In another aspect, an intermediate network node such as a firewall, gateway, electronic mail server or other node or platform may pre-process communications by replacing a document with a link that can be accessed by a recipient to preview the document. In this instance, receiving the request to open the document includes receiving a selection of the link to the document within the electronic mail message (or other communication), which occurs initially at the endpoint or other message recipient device, and causes the sandbox to respond with a preview of the document as appropriate.

The benefits of the system contemplated herein may also be deployed for manual use on an endpoint. For example, secure document access on the endpoint may be facilitated for any local file by deploying a right-click mouse tool that submits the file to a sandbox for scan and preview. Thus the request to open a document may include receiving a right click of an icon for the document within a user interface displayed by the endpoint. As noted above, the preview may be a live preview that permits browsing within the document, and may further permit saving (e.g., to the endpoint), full editing capabilities with a suitably configured application, or some limited form of preview editing to facilitate annotations, screen shots, content clipping, and so forth.

In general, the request to access the document may be received within the user interface of the endpoint, such as by interactions with a web browser, file manager, electronic mail client, or the like that contains an icon or other representation of the document. The interaction may also or instead include a selection of a link inserted into an electronic mail in place of the document, or any other suitable graphical, textual, voice, or other interaction that might be associated with retrieval and viewing of a document.

As shown in step 804, the method 800 may include forwarding the document to a sandbox environment. In general, the document may be forward from the endpoint. However, as noted above, the document may also or instead be forwarded to the sandbox from an intermediate network facility such as a gateway, firewall, electronic mail server, or other messaging gateway or network component residing between the endpoint and a source of the communication that contains the attachment.

As shown in step 806, the method 800 may include scanning a document. In general, the sandbox environment may be configured to support scanning and previewing functions as contemplated herein. For example, the sandbox environment may be configured to open the document, perform malware detection on the document, and support a remote interaction with the document in the sandbox environment from the endpoint. While these functions may be performed separately and discretely, they may also or instead be combined in various ways. For example, a static analysis of the document may be performed without opening the document, however, malware detection may also include opening the document and performing dynamic analysis to detect malicious activity. More generally, any malware techniques contemplated herein may usefully be employed within the sandbox environment to detect malicious or potentially malicious software.

As shown in step 808, the method 800 may include rendering the document. As with malware detection described above, the sandbox environment may incorporate a preview component that provides limited document viewing capabilities along with remote keyboard-video-mouse interactions from an endpoint, or the sandbox environment may provide fully functional applications along with a secure remote desktop or other remote access capabilities. In this latter embodiment, the sandbox environment can provide rich computing capabilities equal to the endpoint, along with remote access for interaction with the sandbox environment remotely from the endpoint. In one aspect, the same application may be used to provide an opened version of the document for previewing and an open version of the document for behavioral analysis.

As shown in step 810, the method 800 may include receiving a presentation of the document, as opened within the sandbox environment, for display on a monitor of the endpoint. A variety of techniques are known in the art for mirroring a user environment on one device for use at a different, remote device and any such techniques may be adapted for use with the systems and methods contemplated herein, including techniques that render an entire user environment, or techniques that only render a particular document, or a graphical interpretation of a single document within a window on the endpoint. In one aspect, the presentation of the document may provide a control such as a button or the like that is not available (e.g., greyed out) before analysis is complete and that becomes available (e.g., operational) and that a user can select to download the document to the endpoint, e.g., after an analysis has been completed and the document has been identified as safe within the sandbox environment.

As shown in step 812, the method 800 may include transmitting the presentation of the document to a monitor of the endpoint for display. In general, the presentation may include an interactive presentation, e.g., that supports user interactions, or the presentation may be a static presentation such as one or more screenshots or the like that can be reviewed by a user before deciding to download a document, or for any other diagnostic or other purposes. The presentation may also or instead provide an editable preview of the document that permits revisions to the underlying document, and/or that supports additional metadata such as annotations or the like.

As shown in step 814, the method 800 may include further processing. For example, the method 800 may include permitting a download of the document to the endpoint if malicious code is not detected during the malware detection when the document is opened within the sandbox environment. Thus, once a document has been verified as safe according to any suitable enterprise criteria, policies or the like, the document may be downloaded to the endpoint. As noted above, the availability of the document may be advertised to a user of the endpoint by providing a download button, link or other user interface control for manual download. In another aspect, the document may be automatically downloaded according to any pre-existing download method once the document has been determined to be safe. Thus in one aspect, the method 800 may support transparent screening and previewing that transitions into ordinary document use if and when a document is verified as safe. This may include restoring the document as an attachment in place of the link, where appropriate. In another aspect, the sandbox may determine a degree of riskiness, and may correspondingly provide an indication of risk for the document to the endpoint based on the malware detection.

A system may also be configured according to the foregoing to secure an endpoint against malware contained in documents opened on the endpoint. For example, a system may include a computing device such as an endpoint coupled to a network, a processor, and a memory bearing computer executable code. The code may be configured to execute on the processor to perform the steps of receiving a request at the endpoint to open a document, forwarding the document to a sandbox environment, wherein the sandbox environment is configured to open the document, perform a malware detection on the document, and support a remote interaction with the document in the sandbox environment from the endpoint, receiving a presentation of the document, as opened within the sandbox environment, for display on a monitor of the endpoint, and transmitting the presentation of the document to the monitor of the endpoint for display.

As described above, receiving the request may include receiving the request within a user interface of the endpoint. Receiving the request may also or instead include detecting a selection of a link inserted into the electronic mail in place of the document. The presentation of the document may include an interactive preview of the document or any other preview suitable for conveying the content of the document to a user and permitting user interactions with the document.

FIG. 9 shows a method for processing electronic mail for secure viewing. In general, the method 900 includes preprocessing documents at an intermediate network node between an endpoint and a source of a document by replacing the document with a link that directs a user of the endpoint to the sandbox environment if the document is selected for viewing or use at the endpoint.

As shown in step 902, the method 900 may begin with receiving an electronic mail message containing a document as an attachment.

As shown in step 904, the method 900 may include removing the document from the electronic mail message. This may include conditionally removing the document based on a reputation of the document. For example, where the electronic mail message is from a trusted party or the document is authored by a trusted party, e.g., a sender that can be verified using a digital signature or the like, the document may be permitted to bypass further sandbox processing, which may occur automatically or manually (e.g., with a message that the document is from a trusted party and requesting authorization of the bypass).

As shown in step 906, the method 900 may include adding a link to the electronic mail message in place of the attachment. In general, the link may be configured for accessing the document in the sandbox environment, such as by providing a suitable uniform resource locator and/or other path information, resource information, network address information, document identifiers, and the like that might be useful for locating and opening the appropriate document within a sandbox environment.

As shown in step 908, the method 900 may include forwarding the electronic mail message with the link to an endpoint. In general, the electronic mail will contain the link in place of the document to permit an end user at the endpoint to access the document via the link. The method 900 may be modified for use with a webmail client that does not download electronic mail message into a local mailbox on the endpoint. In such cases, the link may be placed into the electronic mail before the electronic mail message is delivered to the hosted mail box on the electronic mail server, or the document may be delivered to the sandbox environment when a user selects a download of attachments through the webmail client.

As shown in step 910, the method 900 may include forwarding the document to a sandbox environment. The sandbox environment may include any of the sandbox environments described above and may, for example, be configured to open the document, perform a malware detection on the document, and support a remote interaction with the document in the sandbox environment from an endpoint.

As shown in step 912, the method 900 may include scanning the document in the sandbox environment. This may include any of the scanning or other malware detection techniques contemplated herein.

As shown in step 914, the method 900 may include causing the sandbox environment to open the document in response to accessing the sandbox environment from the endpoint with the link, e.g., from the endpoint or some other device where the electronic mail message might be accessed.

As shown in step 916, the method 900 may include causing the sandbox environment to communicate a presentation of the document to the endpoint where the link was accessed so that the document can be displayed at the endpoint.

As shown in step 918, the method 900 may include notifying a threat management facility of potential threats. For example, if malicious code is detected during the malware detection when the document is opened within the sandbox environment, the threat management facility may be notified of the threat so that further processing decisions can be made. This may, for example, include quarantining the document or any other suitable remedial measures.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer-readable medium that, when executing on one or more computing devices, performs the steps of:
    receiving an electronic mail communication addressed to an endpoint and containing a document as an attachment;
    adding a link in the electronic mail communication in place of the attachment, the link configured for accessing the document in a sandbox environment from the endpoint by connecting the endpoint to a document preview rendered from the sandbox environment;
    communicating the electronic mail communication to the endpoint;
    receiving a request from the endpoint to open the document by detecting a selection of the link;
    forwarding the document to a sandbox environment, wherein the sandbox environment is configured to open the document, perform a malware detection on the document, and support a remote interaction with the document in the sandbox environment from the endpoint by rendering the document preview with the sandbox environment, connecting the endpoint to the document preview, and remotely displaying the document preview to the endpoint; and
    transmitting a presentation of the document from the sandbox environment, as opened within the sandbox environment, to the endpoint for display on a monitor of the endpoint.

2. The computer program product of claim 1 wherein receiving the request includes receiving the request within a user interface of the endpoint.

3. The computer program product of claim 1 wherein the presentation of the document includes an interactive preview of the document.

4. The computer program product of claim 1 wherein the presentation of the document includes an editable preview of the document.

5. A method for accessing a document sent as an attachment, the method comprising:
    transmitting an electronic mail communication to an endpoint, the electronic mail communication including a link in the electronic mail communication in place of the attachment, the link configured for accessing the document in a sandbox environment from the endpoint by connecting the endpoint to a document preview rendered from the sandbox environment;
    receiving a request from the endpoint to open the document by detecting a selection of the link;
    forwarding the document to a sandbox environment, wherein the sandbox environment is configured to open the document, perform a malware detection on the document, and support a remote interaction with the document in the sandbox environment from the endpoint by rendering the document preview with the sandbox environment, connecting the endpoint to the document preview, and remotely displaying the document preview to the endpoint; and
    transmitting a presentation of the document from the sandbox environment, as opened within the sandbox environment, to the endpoint for display on a monitor of the endpoint.

6. The method of claim 5 wherein the document includes an attachment to an electronic communication received at the endpoint.

7. The method of claim 5 wherein the document includes at least one of a word processing document, a spreadsheet, a portable document format document, or a presentation document.

8. The method of claim 5 wherein receiving the request to open the document includes receiving a right click of an icon for the document within a user interface displayed by the endpoint.

9. The method of claim 5 further comprising permitting a download of the document to the endpoint if malicious code is not detected during the malware detection when the document is opened within the sandbox environment.

10. The method of claim 5 further comprising providing an indication of risk for the document to the endpoint based on the malware detection.

11. The method of claim 5 wherein the document is a file locally stored on the endpoint.

12. The method of claim 5 wherein the document is an attachment to an electronic mail message.

13. The method of claim 5 wherein the document is a remote document identified by a uniform resource locator.

14. The method of claim 5 wherein the request to open the document is an automated request from a background process configured to scan an electronic mail inbox for attachments.

15. A system for securing an endpoint against malware contained in documents opened on the endpoint, the system comprising:
    a computing device coupled to a network;
    a processor; and
    a memory bearing computer executable code configured to perform the steps of transmitting an electronic mail communication containing a document as an attachment to an endpoint, the electronic mail communication including a link in the electronic mail communication in place of the attachment, the link configured for accessing the document in a sandbox environment from the endpoint by connecting the endpoint to a document preview rendered from the sandbox environment, receiving a request from the endpoint to open the document by detecting a selection of the link, forwarding the document to the sandbox environment, wherein the sandbox environment is configured to open the document, perform a malware detection on the document, and support a remote interaction with the document in the sandbox environment from the endpoint by rendering the document preview with the sandbox environment, connecting the endpoint to the document preview, and remotely displaying the document preview to the endpoint, and transmitting a presentation of the document from the sandbox environment, as opened within the sandbox environment, to the endpoint for display on a monitor of the endpoint.

16. The system of claim 15 wherein receiving the request includes receiving the request within a user interface of the endpoint.

17. The system of claim 15 wherein the presentation of the document includes an interactive preview of the document.

18. A computer program product comprising computer executable code embodied in a non-transitory computer-readable medium that, when executing on a gateway of an enterprise network, performs the steps of:

receiving an electronic mail communication containing a document as an attachment;

removing the document;

forwarding the document to a sandbox environment for interactive access from an endpoint, wherein the sandbox environment is configured to open the document, perform a malware detection on the document, and support a remote interaction with the document in the sandbox environment from the endpoint by rendering a document preview with the sandbox environment, connecting the endpoint to the document preview, and remotely displaying the document preview to the endpoint;

adding a link in the electronic mail communication in place of the attachment, the link configured for accessing the document in the sandbox environment from the endpoint by connecting the endpoint to the document preview rendered from the sandbox environment; and forwarding the electronic mail communication with the link to the endpoint.

19. The computer program product of claim 18 further comprising code that performs the step of causing the sandbox environment to open the document and render the document for display at the endpoint in response to accessing the sandbox environment from the endpoint with the link.

20. The computer program product of claim 18 further comprising code that performs the step of notifying a threat management facility if malicious code is detected during the malware detection when the document is opened within the sandbox environment.

21. The computer program product of claim 18 wherein removing the document includes conditionally removing the document based on a reputation of the document.

* * * * *